UNITED STATES PATENT OFFICE.

NELSON GILES, JR., LUKE ELBRIDGE BROWN, AND WALTER ELBRIDGE BROWN, OF NATIONAL CITY, CALIFORNIA.

INSECTICIDE.

SPECIFICATION forming part of Letters Patent No. 438,593, dated October 14, 1890.

Application filed January 6, 1890. Serial No. 336,096. (No specimens.)

*To all whom it may concern:*

Be it known that we, NELSON GILES, Jr., LUKE ELBRIDGE BROWN, and WALTER ELBRIDGE BROWN, citizens of the United States, residing at National City, in the county of San Diego, State of California, have invented a new and useful Composition of Matter for the Destruction of Vermin, Mites, and Parasites upon Fowls and other Birds, of which the following is a specification.

Our composition consists of the following ingredients combined in the proportions stated: creosote, ninety-one gallons; turpentine, two gallons; oil of cedar, two gallons; coal-oil, five gallons. These ingredients are to be thoroughly mingled.

In using the above-named composition it should be placed upon the roosts and other affected parts of the house, roosting-place, or cage for the birds.

We are aware that turpentine, kerosene, and carbolic acid have been used together in an insecticide. Such, therefore, we do not claim.

What we do claim, and desire to secure by Letters Patent of the United States, is—

The herein-described composition of matter to be used for the destruction of vermin, mites, and parasites affecting fowls and other birds, consisting of creosote, turpentine, oil of cedar, and coal-oil, in the proportions specified.

NELSON GILES, JR.
LUKE ELBRIDGE BROWN.
WALTER ELBRIDGE BROWN.

Witnesses:
M. L. WARD,
A. E. NUTT.